(No Model.)
J. R. ERVIN.
Band Cutter and Feeder for Thrashing Machines.
No. 241,200. Patented May 10, 1881.
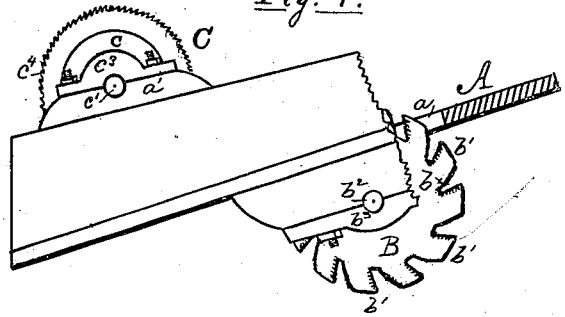
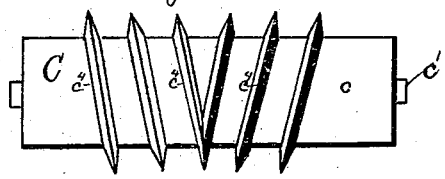
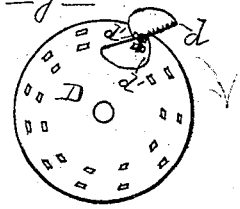
Witnesses:
R. A. Swan
Myron B. W. Hough
Inventor:
Jas. R. Ervin
per A. G. Lyne
N. PETERS, Photo-Lithographer, Washington, D. C.

UNITED STATES PATENT OFFICE.

JAMES R. ERVIN, OF MARSHALL, MISSOURI.

BAND-CUTTER AND FEEDER FOR THRASHING-MACHINES.

SPECIFICATION forming part of Letters Patent No. 241,200, dated May 10, 1881.

Application filed January 24, 1881. (No model.)

*To all whom it may concern:*

Be it known that I, JAMES R. ERVIN, a citizen of the United States, residing at Marshall, in the county of Saline and State of Missouri, have invented a new and useful Improvement in Band-Cutters and Feeders for Thrashing-Machines; and I do hereby declare that the following is a full, clear, and exact description of the same, reference being had to the drawings hereto annexed, in which—

Figure 1 is a side elevation, partly in section; Fig. 2, the feeder, and Fig. 3 a disk for carrying reversible teeth.

The object of my invention is to provide a simple and effective device which may be easily attached to any thrashing-machine for cutting the bands (whether of straw or wire) with which the sheaves are bound, and at the same time spreading and equalizing the feed before it comes in contact with the thrashing-cylinder.

To this end I construct an inclined apron, A, similar in form to the apron of an ordinary thrasher, and adapted to be conveniently attached to any thrashing-machine. This apron, which is lined with any suitable metal, is provided with a series of parallel longitudinal slots, $a$, through which the cutters B rotate to cut the bands of the sheaves as they are placed upon the apron. These cutters, which may be of any desired number, are steel disks rigidly secured upon a shaft, $b^2$, which is journaled in bearings $b^3$ upon the under side of said apron, and to be provided with a suitable pulley upon one end, to which a belt may be attached for communicating motion to the cutters. The said disks, which are arranged parallel to each other and co-ordinately with the slots $a$, are provided with angular slots $b$, cut in their peripheries to form the teeth $b'$, which are forwardly inclined, so as to seize the band like a hook, thereby insuring its complete severance. I also construct a smooth disk, D, having a series of adjustable teeth, $d$, secured by bolts near its outer edge. Said teeth are reversibly inclined from their center to their ends, and are provided with transverse slots $d'$ near the center, whereby they may be secured in any desired position by means of two bolts or screws passing through the disk. One end of said teeth is made notched for cutting straw bands, and the other smooth for cutting wire. The advantage of this arrangement is that the same disk will suffice for cutting all kinds of bands, and when the teeth wear out they may be replaced at a very small cost.

As these cutters have a forward movement they tend to carry the sheaf forward and downward along the apron, while the equalizer C, which is arranged above the apron and has a backward or reverse movement, secures the perfect feeding of the straw. This feed-equalizer consists of a cylinder, $c$, secured upon a shaft, $c'$, which is journaled in bearings $c^3$, resting upon supports $a'$ attached to the sides of said apron. This cylinder is provided with a number of annular blade-like flanges, $c^4$, arranged obliquely thereon, so that the two central rings shall form an acute angle with each other, while the remaining rings shall be parallel therewith respectively. These flanges are slightly serrated, to enable them the better to take hold upon the sheaf which is to be separated.

To provide against choking the feeder when several sheaves are inserted at once, I construct the bearings $c^3$ with the usual rubber springs, whereby the feeder C may be allowed to yield, and thus prevent such accidents.

It is designed that the cutters B shall be inclosed within a suitable casing attached to the under side of the apron, and also that a gage-board shall be arranged in front of the feeder, in order that the sheaf may be guided thereunder with greater facility.

I claim as my invention—

1. In a thrashing-machine, a band-cutter consisting of a series of disks having teeth forwardly inclined at their bases, substantially as shown and described, whereby they may hook under the bands, as set forth.

2. In a thrashing-machine, a feeder consisting of a roller having two sets of serrated annular flanges, so arranged with respect to each other that the planes of the two central rings, which meet, and those of each two successive ones, if produced, shall form an acute angle, substantially as shown, and for the purpose specified.

3. In a thrashing-machine, a reversible tooth for a band-cutter, having one edge smooth for cutting wire, and the other serrated for cutting straw bands, substantially as shown and described, the said tooth being reversibly inclined from its center to its ends, as set forth.

JAMES R. ERVIN.

Witnesses:
RUTLEDGE WILLSON,
A. H. KRAUSE.